(No Model.)
C. M. CLARKE.
BICYCLE SEAT.
No. 334,164. Patented Jan. 12, 1886.
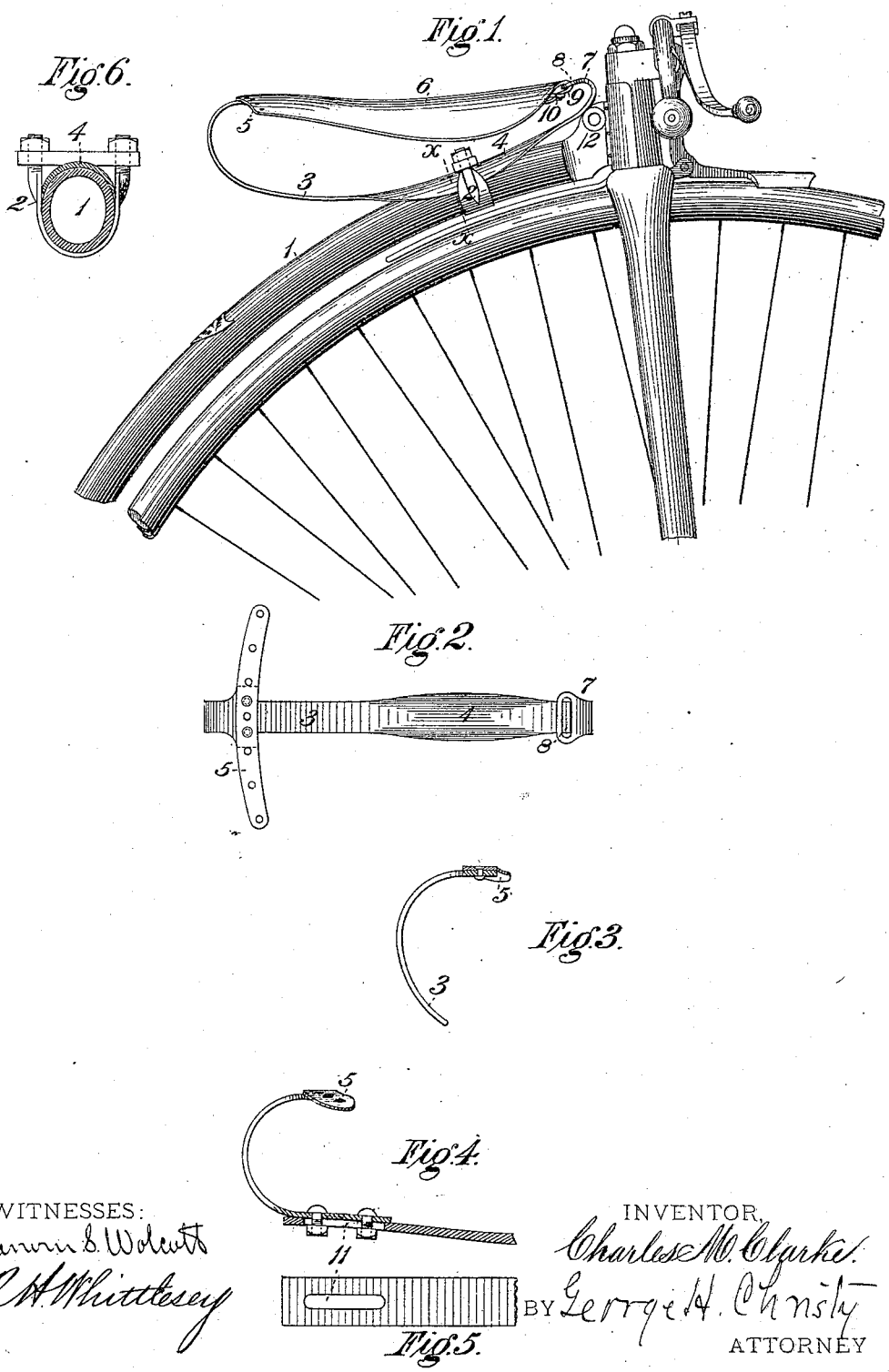
WITNESSES:
Darwin S. Wolcott
R. H. Whittlesey
INVENTOR
Charles M. Clarke.
BY George H. Christy
ATTORNEY

UNITED STATES PATENT OFFICE.

CHARLES M. CLARKE, OF PITTSBURG, PENNSYLVANIA.

BICYCLE-SEAT.

SPECIFICATION forming part of Letters Patent No. 334,164, dated January 12, 1886.

Application filed July 6, 1885. Serial No. 170,689. (No model.)

*To all whom it may concern:*

Be it known that I, CHARLES M. CLARKE, residing at Pittsburg, in the county of Allegheny and State of Pennsylvania, a citizen of the United States, have invented or discovered certain new and useful Improvements in Bicycle-Seats, of which improvements the following is a specification.

In the accompanying drawings, which make part of this specification, Figure 1 is a side elevation of a portion of a bicycle having my improved saddle secured in place thereon. Fig. 2 is a top plan view of the saddle-spring. Fig. 3 is a side elevation of the rear portion of the spring, showing the manner of securing the cross-bar. Fig. 4 is a side elevation of a modified form of the spring. Fig. 5 is a top plan view of a portion of the same. Fig. 6 is a sectional view, the section being taken on the line x x, Fig. 1.

The invention herein relates to certain improvements in the class or kind of bicycle-saddles in which the saddle proper is suspended from springs attached to the reach or backbone of the machine, and the object of said invention is to so construct the spring-support of the saddle and to so attach such spring that the inclination of the saddle may be readily and quickly adjusted, and that the elasticity of the greater part of the spring may be effective in resisting shocks to which the machine may be subjected; and to these ends my invention consists in the construction and combination, all as more fully hereinafter described and claimed.

To the reach or backbone 1 is attached, by means of the clip 2, the spring 3, provided with an enlarged spoon-shaped portion, 4, adapted to fit the backbone and afford a sufficient bearing for the spring. The rear end of the spring curves gradually upward for a short distance and then curves abruptly upward and inward over the lower main portion. To the end of the rear portion of the spring is secured by rivets or other suitable means the cross-piece 5, provided with a series of holes, through which are passed the lacings or rivets, whereby the rear end of the flexible seat 6 is secured to the cross-piece. The front portion, 7, of the spring is formed in a manner similar to the rear end, with the exception that the radii of the curves of the front portion are preferably shorter than those of the rear portion. The free end of the front portion projects rearwardly over the main portion of the spring, and is provided with an eye, 8, through which is passed a strap or tongue, 9, formed on or secured to the front end of the flexible seat, said tongue or strap being secured to the under part of the saddle by the buckle 10, as clearly shown, whereby the tension of the flexible seat may be adjusted as desired. If desired, this C-shaped spring may be made in two parts, as shown in Fig. 4, one part being provided with a slot, 11, and the other being secured thereto by means of bolts passing through the slot. By this construction provision is made for lengthening the spring either for the purpose of tightening the flexible seat or for permitting the use of longer or shorter seats. In lieu of securing the cross-piece to the rear end of the spring by rivets or bolts, said cross-piece may, if desired, be formed integral with the spring; but I prefer the construction shown, as being less expensive.

In securing the spring to the reach or backbone the forward end is supported by the shoulder 12 projecting rearwardly from the neck of the reach, as shown in Fig. 1, and by moving the spring along the backbone the front end thereof will be raised or lowered, according to the direction in which the spring is moved. It will be observed that the curvature of the spring is such that it has a comparatively short bearing upon the backbone, and in securing the spring in place the clip should be placed a little forward of the normal bearing-point of the spring.

The construction of spring above described permits of placing the seat in closer proximity to the backbone than in that class of machines where the seat is attached to the middle of a spring having its ends secured to the backbone, or even in that kind where two springs are employed.

In case it is desired to place the spring so far back or down the reach or backbone that its forward end will not be supported by the shoulder 12, I employ two clips, one at each end of the spoon-shaped bearing 4, for securing the spring to the reach.

I claim herein as my invention—

1. The combination of the reach or backbone of a bicycle, a spring having upturned ends and secured at or near its middle point to said backbone and in such position thereon that its forward end may be supported on a shoulder formed on the neck of the reach, and a flexible seat having its front and rear ends attached to the upturned ends of the spring, substantially as set forth.

2. The combination of the reach or backbone of a bicycle, a C-shaped spring adjustably secured at or near its middle point to said backbone, its forward end being supported by a shoulder formed on the neck of the backbone, and a flexible seat having its front and rear ends attached to the ends of the spring, substantially as set forth.

In testimony whereof I have hereunto set my hand.

CHARLES M. CLARKE.

Witnesses:
R. H. WHITTLESEY,
DARWIN S. WOLCOTT.